May 26, 1925.
J. C. WAHL
1,538,913
FILLING MACHINE
Filed Nov. 22, 1920 13 Sheets-Sheet 1
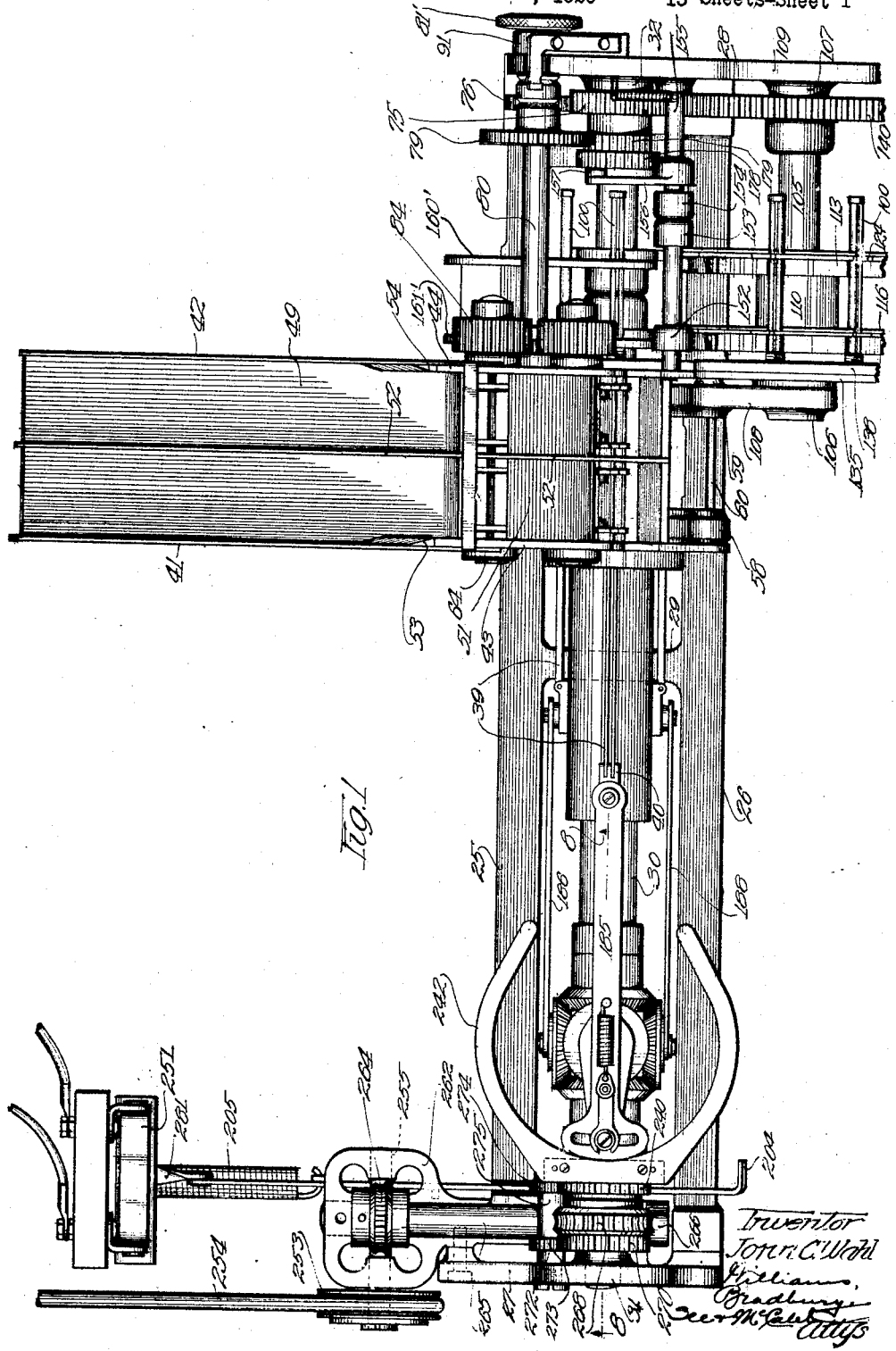

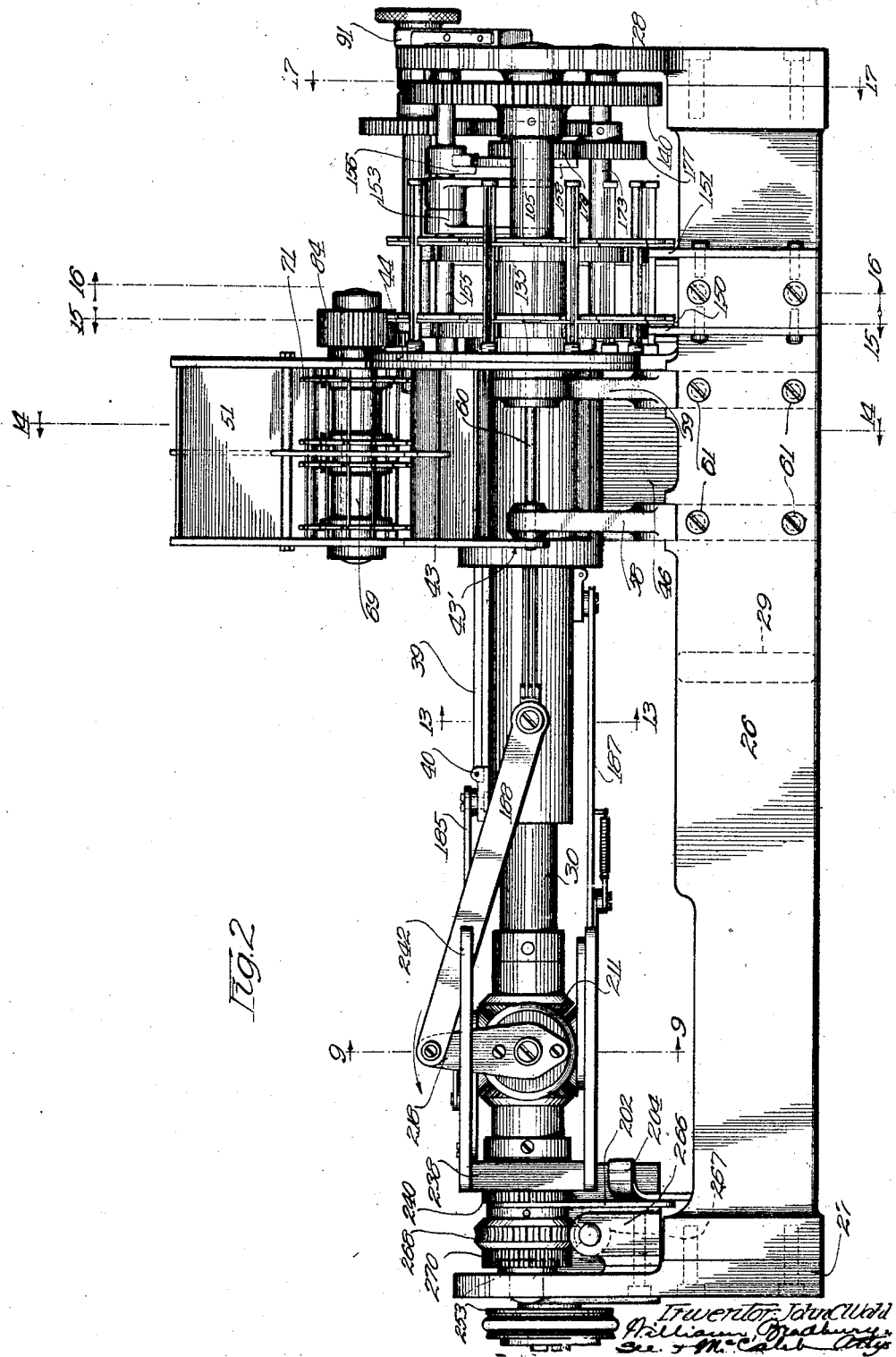

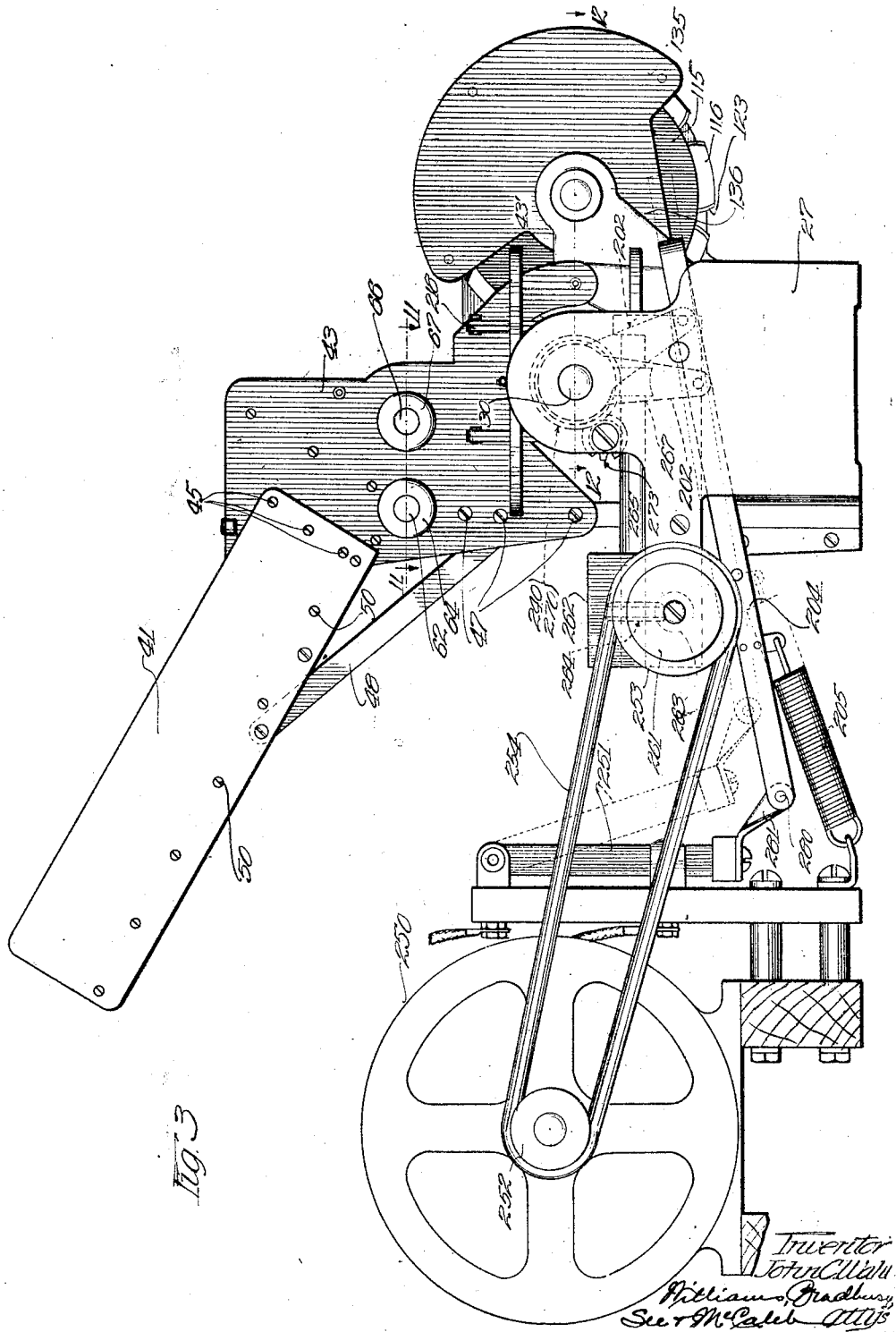

May 26, 1925.
J. C. WAHL
FILLING MACHINE
Filed Nov. 22, 1920     13 Sheets-Sheet 4
1,538,913
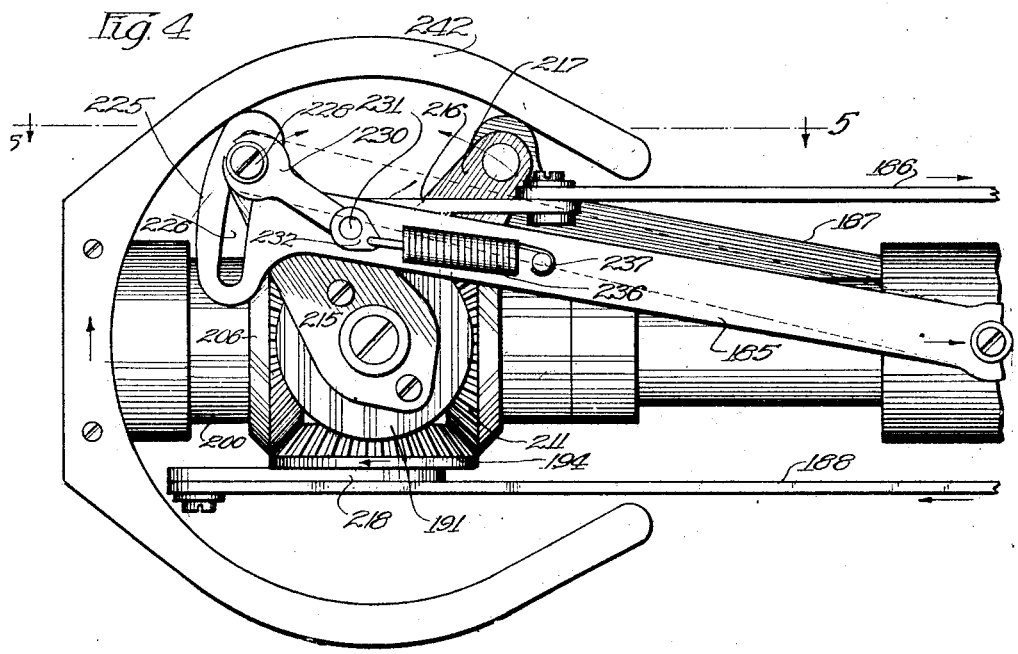
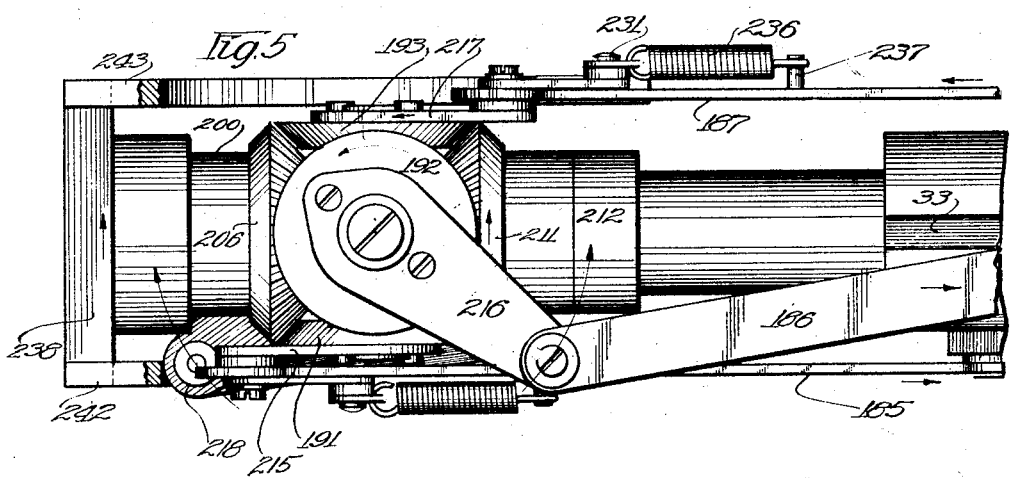
Inventor
John C. Wahl May 26, 1925.
J. C. WAHL
FILLING MACHINE
Filed Nov. 22, 1920
1,538,913
13 Sheets-Sheet 5
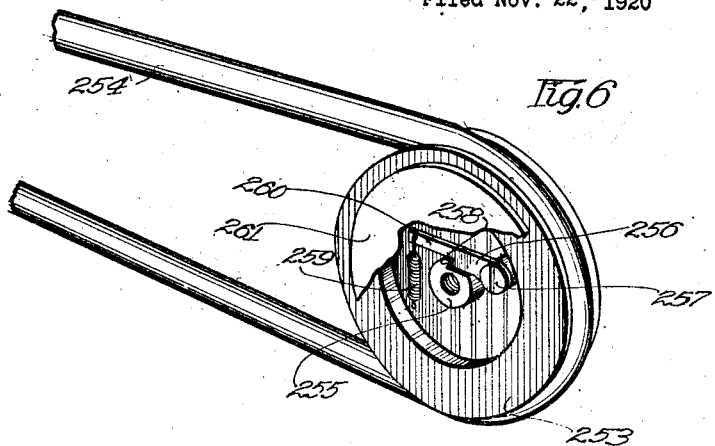
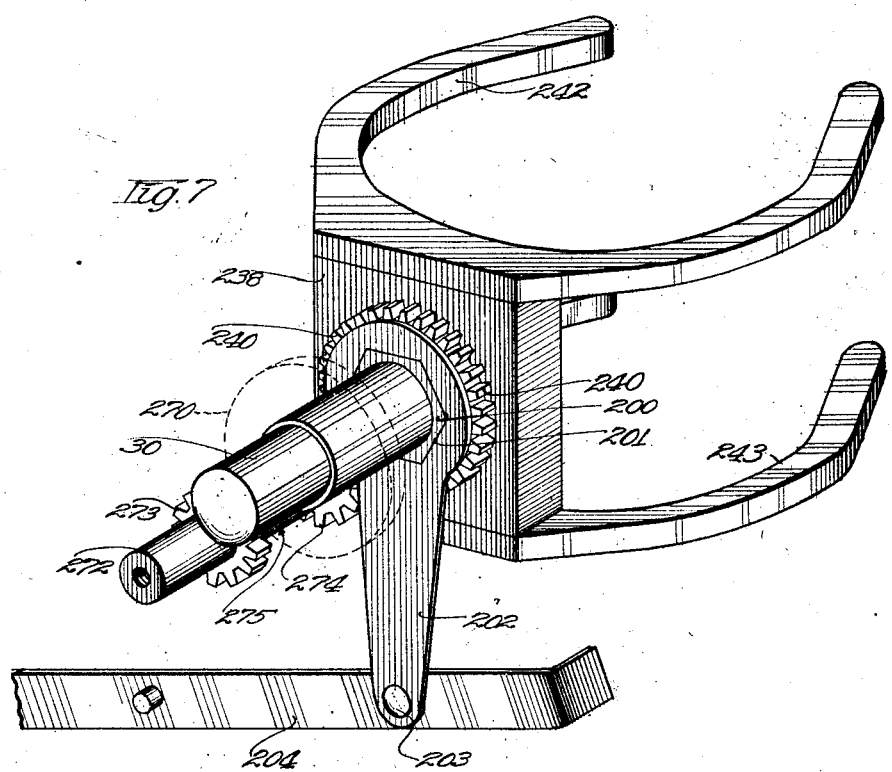
Inventor:
John C. Wahl
Williams, Bradbury,
See &McCaleb Attys.

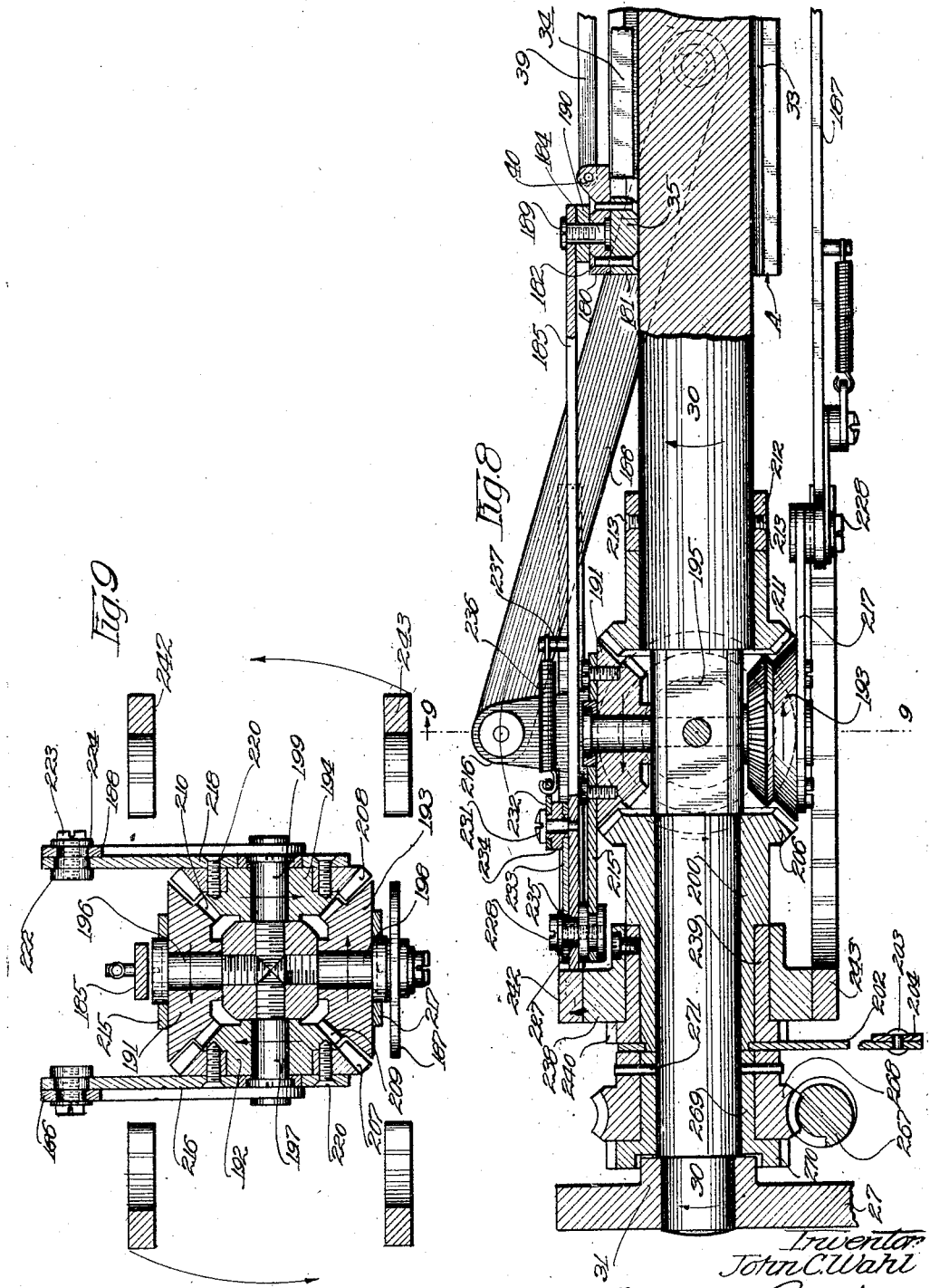

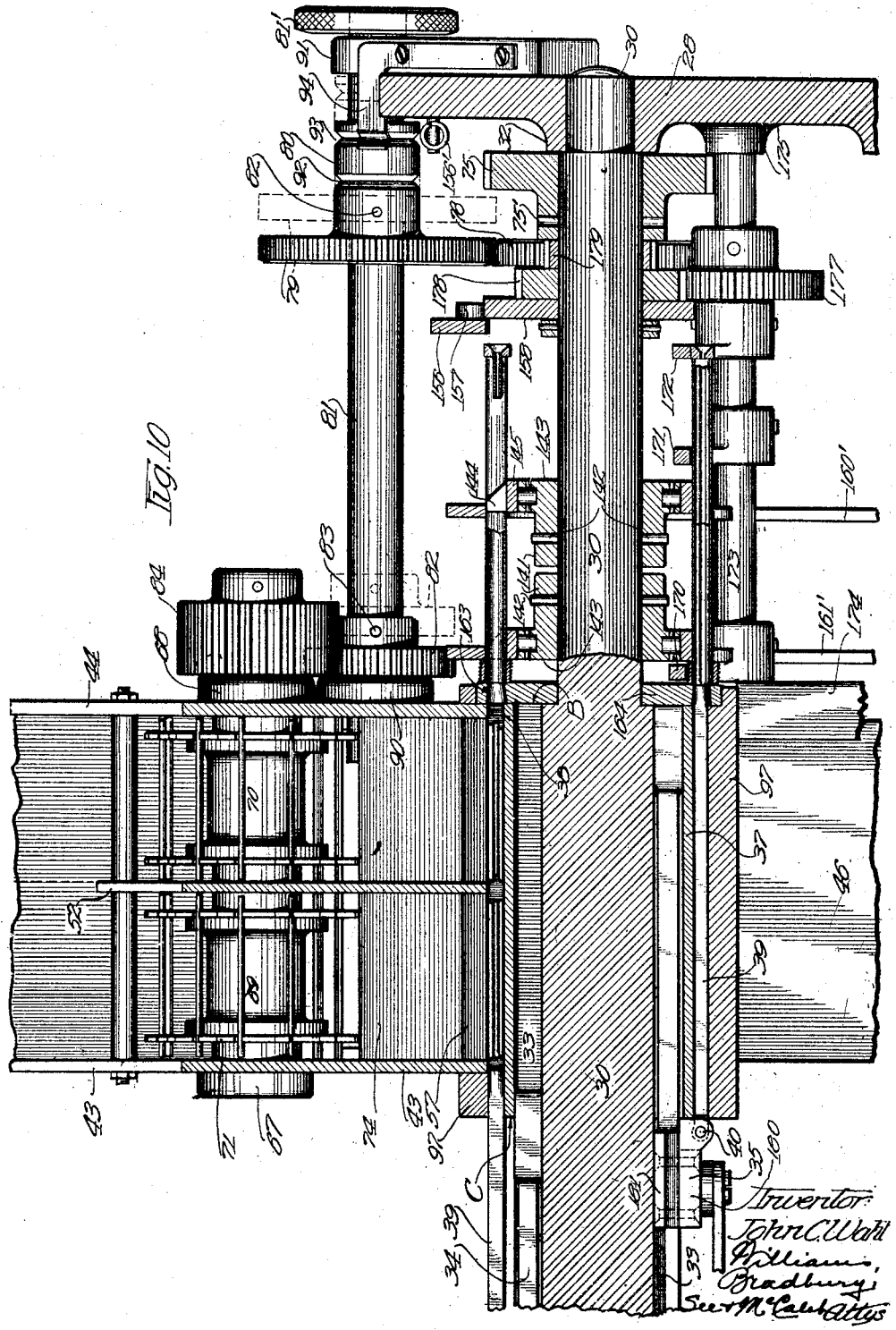

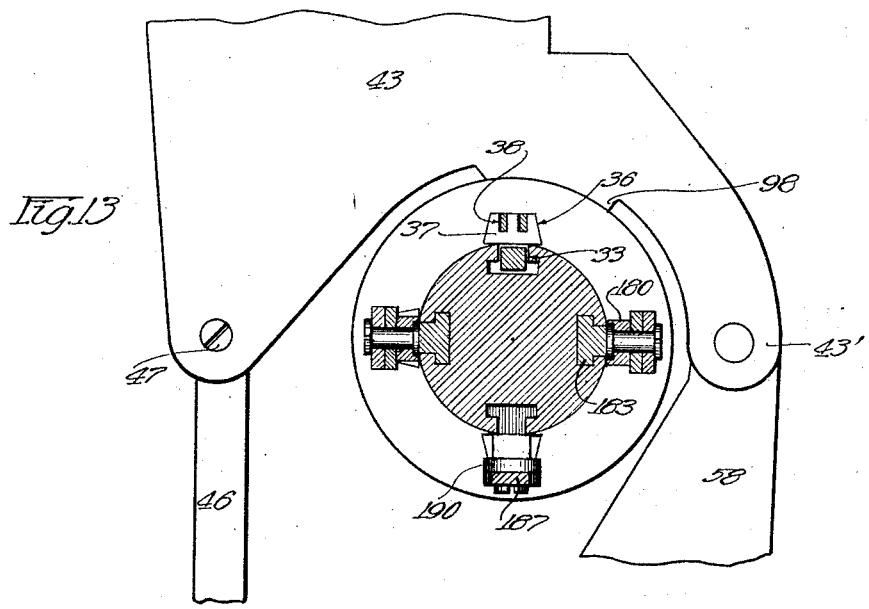
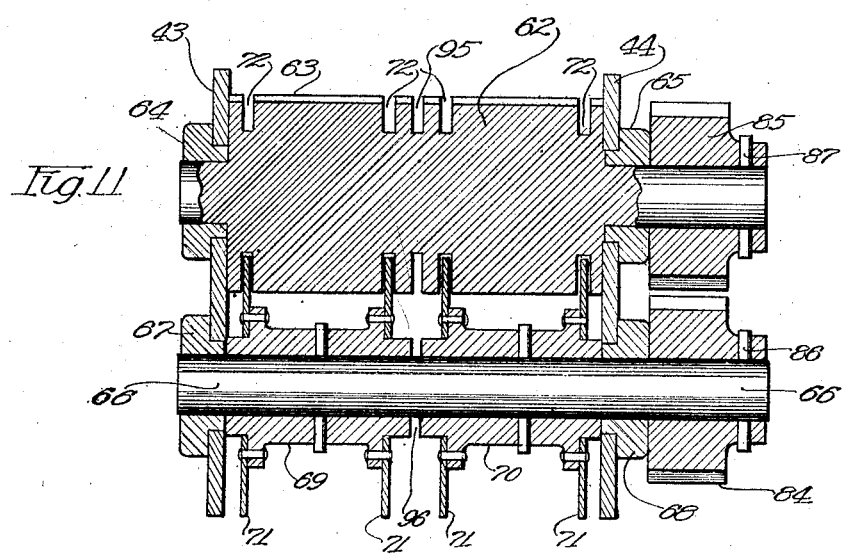

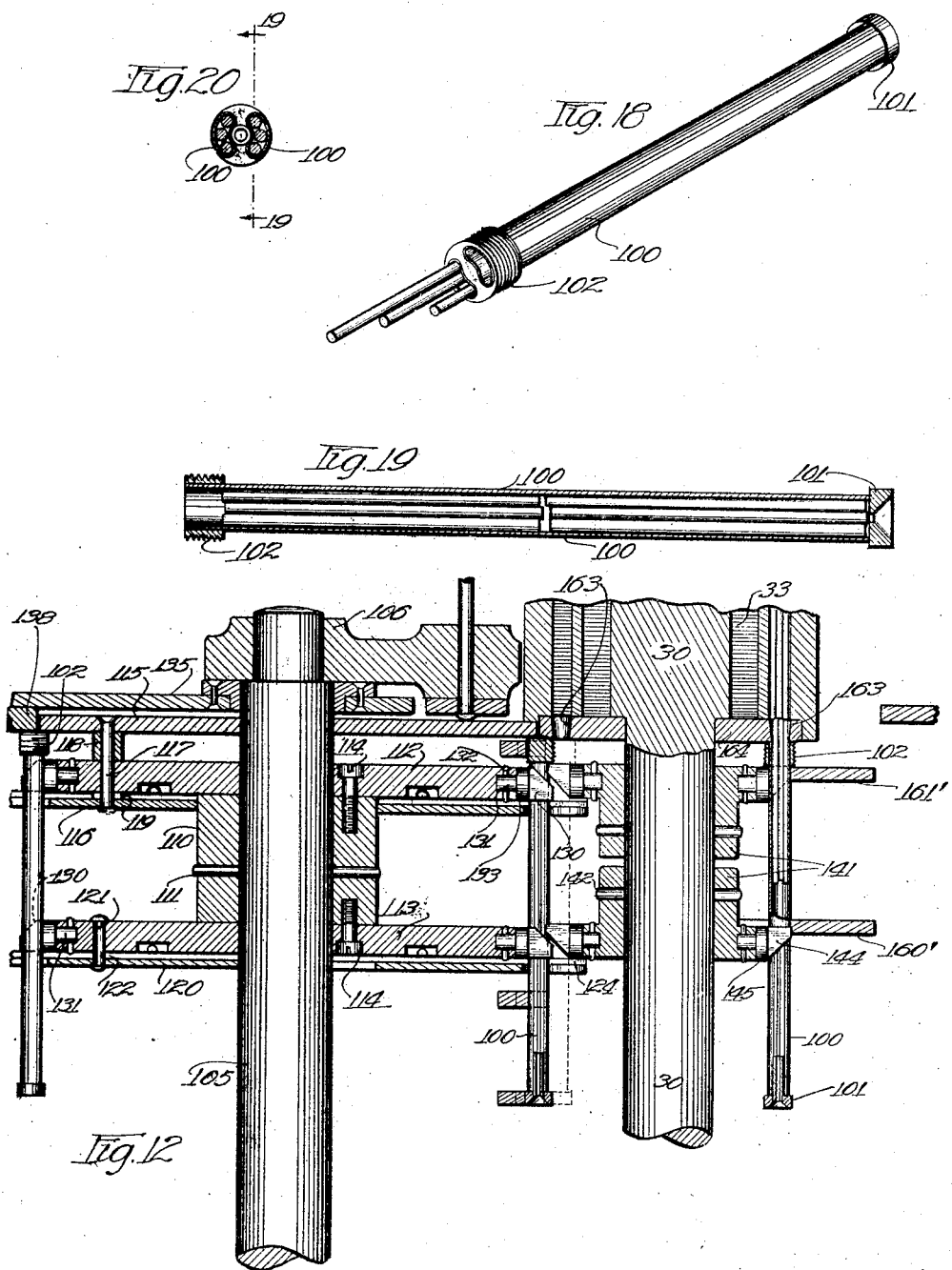

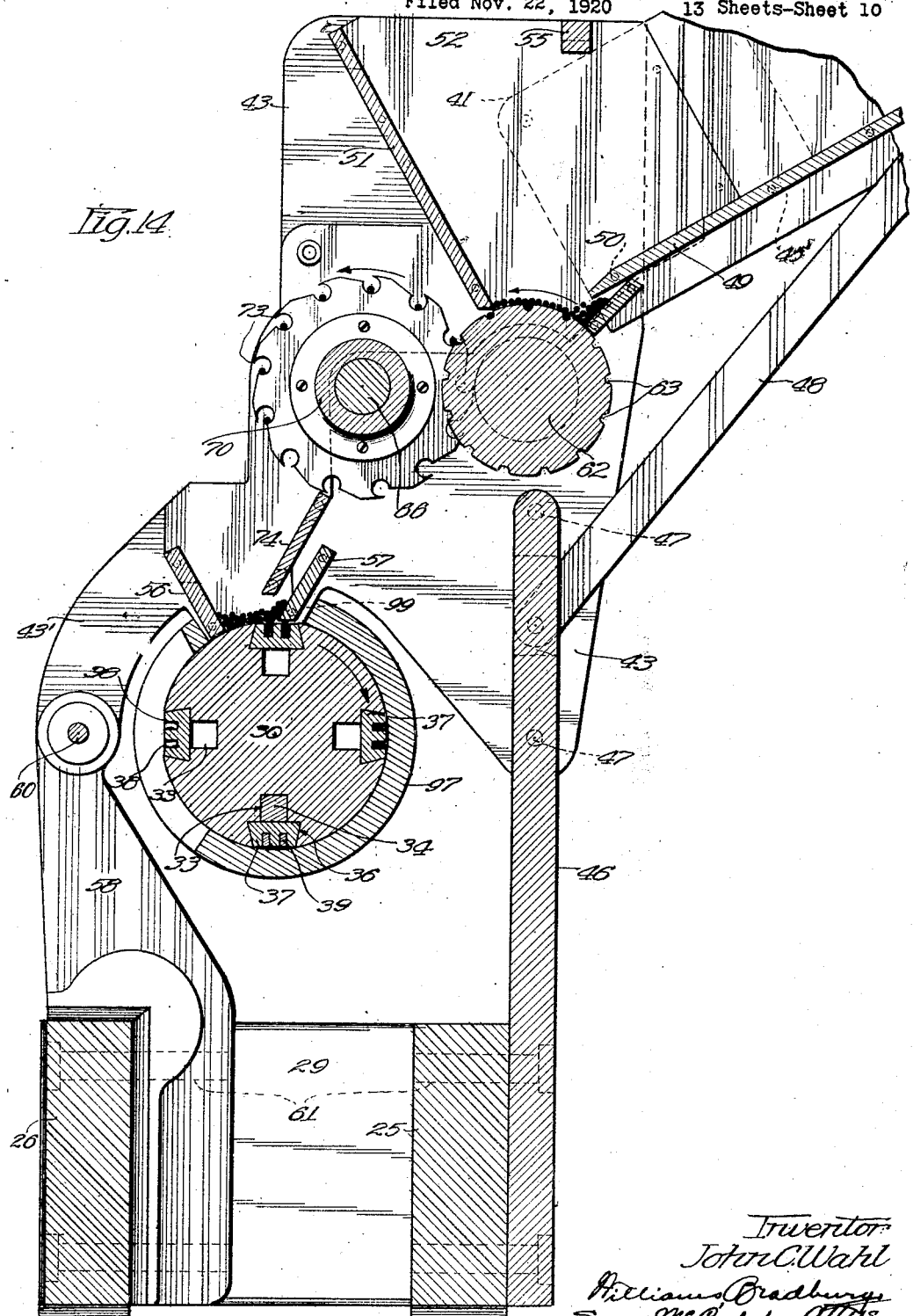

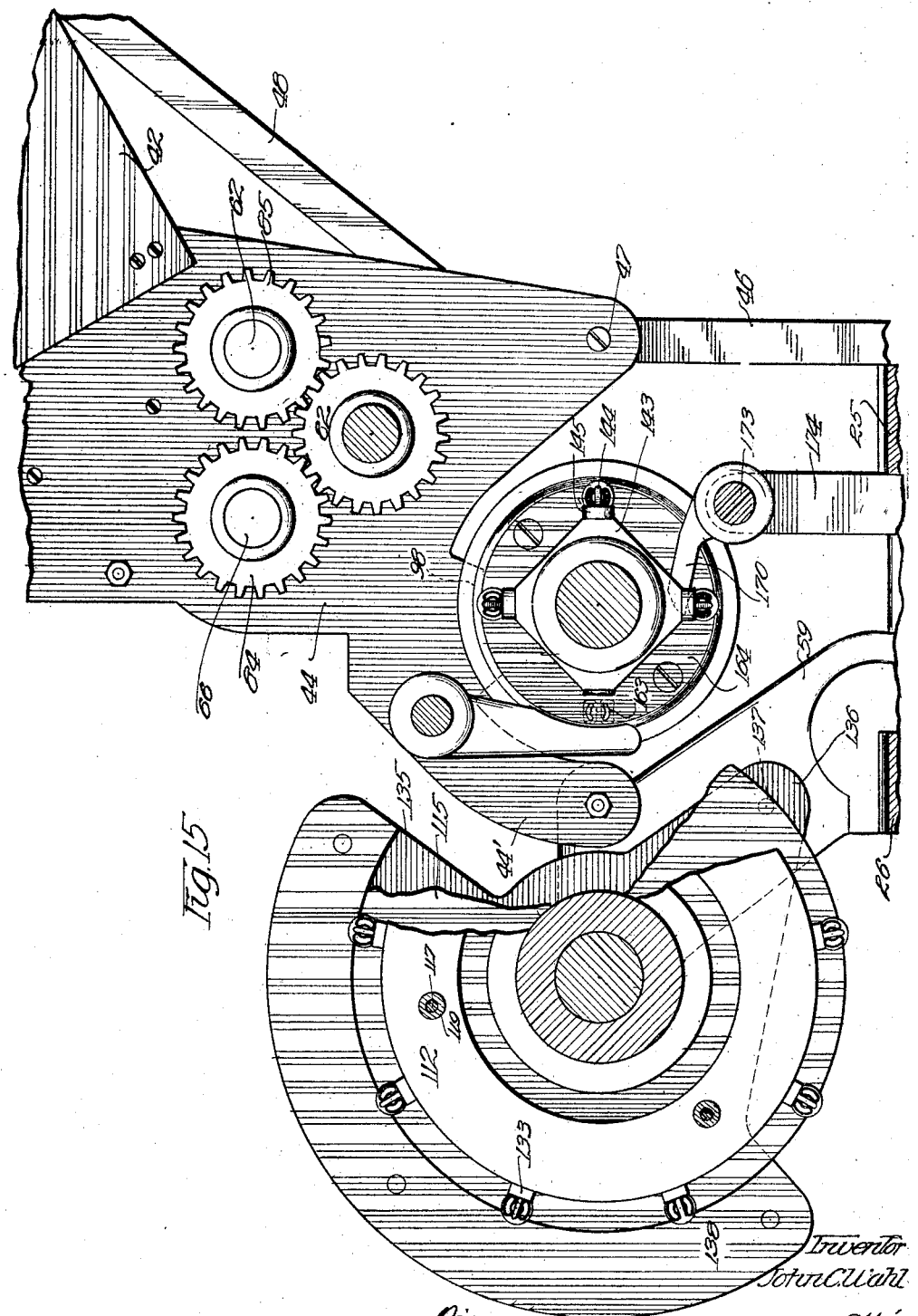

May 26, 1925.

J. C. WAHL 1,538,913

FILLING MACHINE

Filed Nov. 22, 1920     13 Sheets-Sheet 12

Inventor:
John C. Wahl
Williams, Bradbury,
See & McCaleb Attys.

May 26, 1925. 1,538,913
J. C. WAHL
FILLING MACHINE
Filed Nov. 22, 1920 13 Sheets-Sheet 13
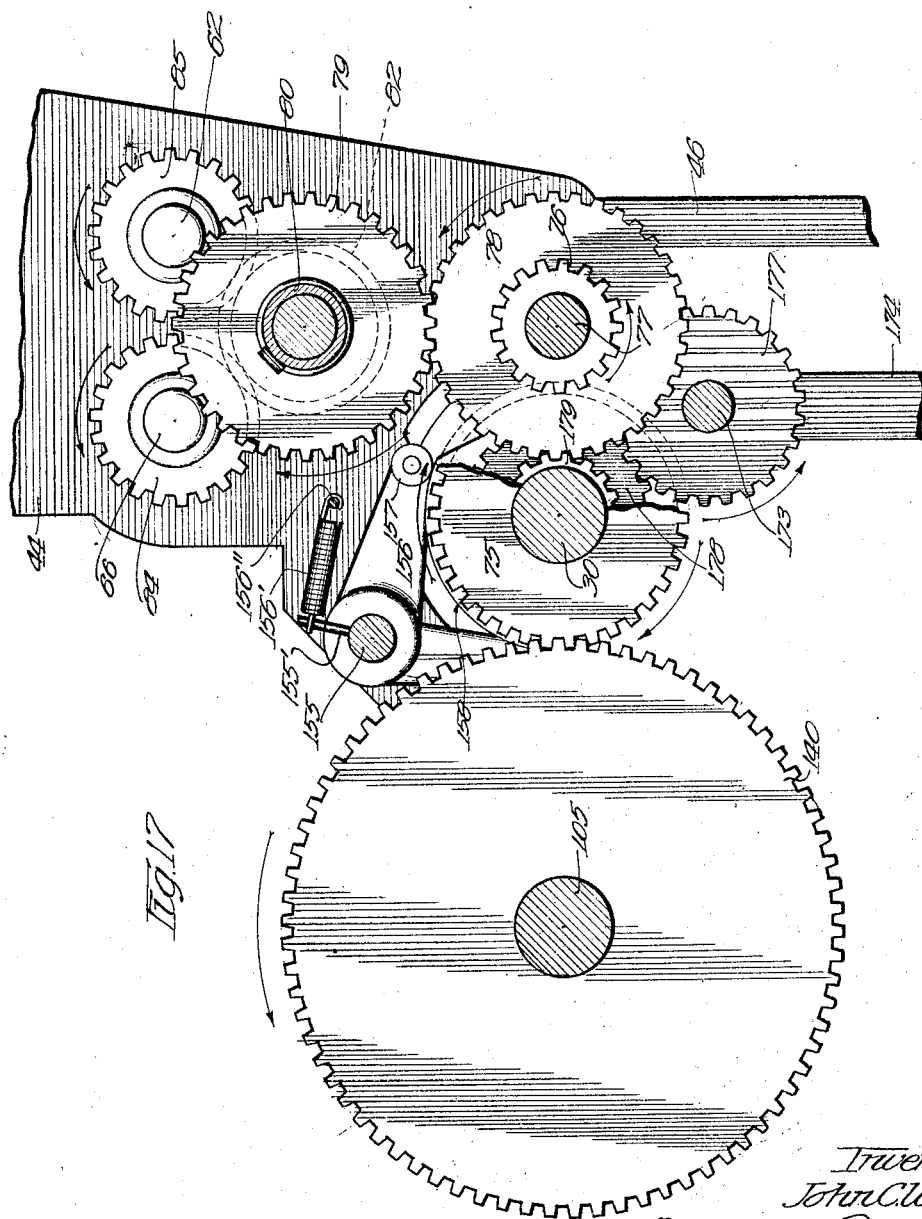

Patented May 26, 1925.

1,538,913

UNITED STATES PATENT OFFICE.

JOHN C. WAHL, OF CHICAGO, ILLINOIS, ASSIGNOR TO THE WAHL COMPANY, OF CHICAGO, ILLINOIS, A CORPORATION OF DELAWARE.

FILLING MACHINE.

Application filed November 22, 1920. Serial No. 425,904.

*To all whom it may concern:*

Be it known that I, JOHN C. WAHL, a citizen of the United States, and resident of Chicago, in the county of Cook and State of Illinois, have invented a certain new and useful Improvement in Filling Machines, of which the following is a full, clear, concise, and exact description, reference being had to the accompanying drawings, forming a part of this specification.

My invention relates to improvements in filling machines, and is particularly concerned with improvements in a filling machine adapted to insert rod-like objects, such as pencil leads, into containers, such, for instance, as the magazines of refillable lead pencils.

The objects of my invention are

1st. to provide a machine for automatically inserting rod-like objects, such as pencil leads, into containers or receivers such, for instance, as magazines for refillable lead pencils.

2nd. to provide a filling machine by means of which the rod-like objects are inserted into the containers by a movement of the rod-like objects and the containers longitudinally relatively to each other.

3rd. to provide a machine of the character described which will automatically take from a supply of the rod-like objects, a predetermined number thereof and insert them into containers which are automatically brought by the machine into registry with the ends of the rod-like objects.

4th. to provide a filling machine comprising means for successively receiving a plurality of the containers to be filled, means for automatically selecting a predetermined number of the rod-like objects to be inserted in said container, means for inserting said rod-like objects into said container, and means for successively discharging the filled containers from the machine.

5th. to provide a machine of the character described which will automatically eliminate defective ones of the rod-like objects to prevent them from being inserted in the containers.

6th. to provide a machine of the character described comprising means for preventing injury to it in case any parts thereof are stopped by the jamming therein of either the rod-like objects or the containers, and 7th. to provide a machine of the character described which is simple in construction, reliable and easy to operate.

Other objects will appear as this description progresses, reference being had to the accompanying drawings, in which—

Figure 1 is a plan view of my improved filling machine.

Figure 2 is a front elevation thereof.

Figure 3 is an end elevation looking toward the left hand end in Figures 1 and 2, this figure showing the motor which is omitted from Figures 1 and 2.

Figure 4 is an enlarged detail plan showing certain details of construction of the plunger operating mechanism.

Figure 16:
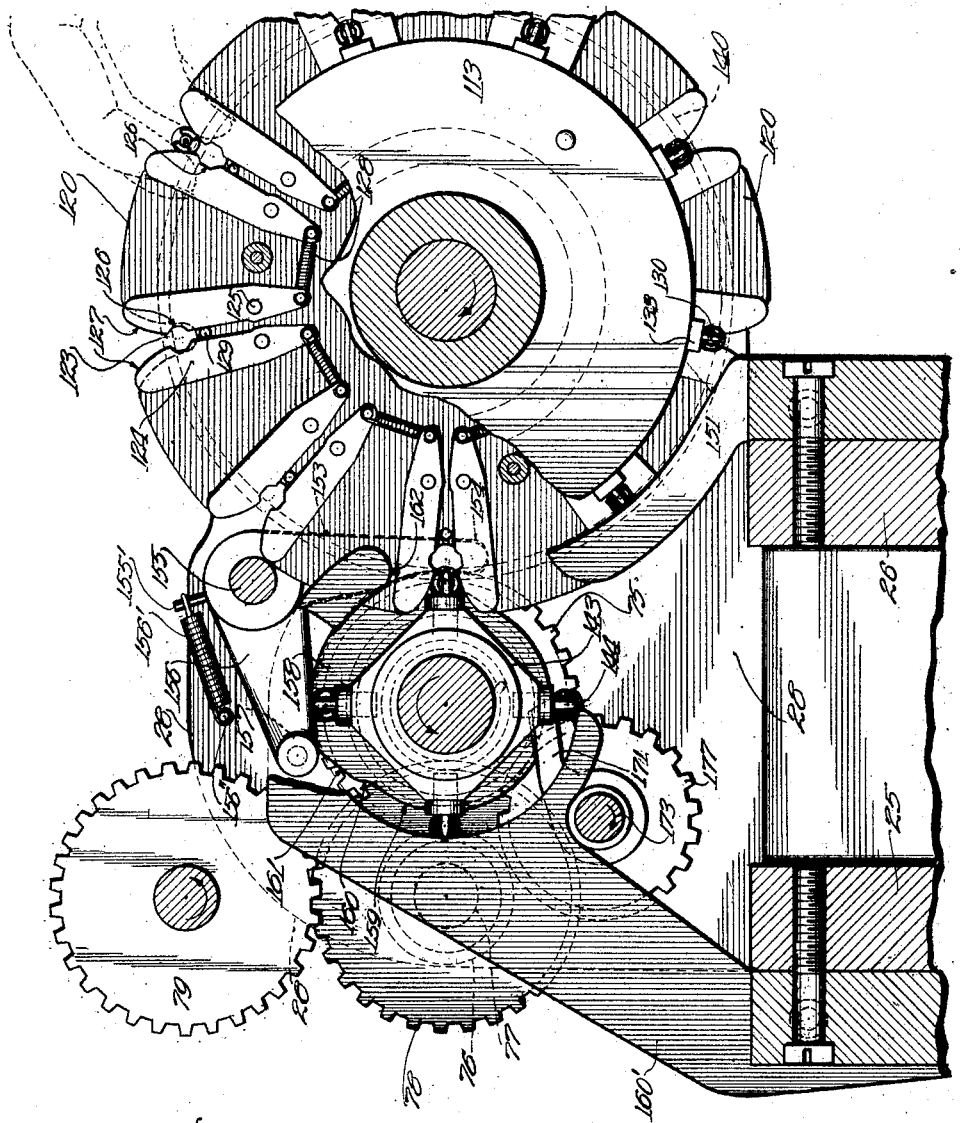

Figure 5 is an elevation taken on line 5—5 of Figure 4. Figures 4 and 5 show parts rotated approximately 55° beyond the position shown in the remaining views.

Figure 6 is a perspective view showing certain details of construction of the driving mechanism.

Figure 7 is a perspective view showing a portion of the mechanism shown in Figures 4 and 5 and the means by which it is driven.

Figure 8 is a longitudinal sectional detail taken substantially on line 8—8 of Figure 1.

Figure 9 is a transverse section taken substantially on line 9—9 of Figure 2 and Figure 8.

Figure 10 is a vertical longitudinal section taken on substantially the same line as Figure 8, but showing details of construction of the opposite end of the machine.

Figure 11 is an enlarged horizontal section taken substantially on line 11—11 of Figure 3, portions thereof being broken away.

Figure 12 is a horizontal section taken on line 12—12 of Figure 3, showing certain details of construction of the magazine receiving and filling mechanism, portions of the machine being broken away.

Figures 13, 14, 15, 16 and 17 are vertical transverse sections taken substantially on lines 13—13, 14—14, 15—15, 16—16, and 17—17 respectively, of Figure 2.

Figure 18 is a perspective view of a lead pencil magazine adapted to be filled by the particular embodiment of my invention disclosed in this application.

Figure 19 is a longitudinal section through the magazine taken on line 19—19 of Figure 20, and showing the arrangement of leads therein, and Figure 20 is a cross-section through said magazine.

Throughout the several figures, similar reference characters will be used for referring to similar parts and the various sections are taken looking in the direction of the small arrows.

The following detailed description of my filling machine will be more clearly understood if its general construction and mode of operation are first described.

Briefly speaking, it comprises a main shaft driven from a motor through suitable power transmitting devices. A section of the shaft is enlarged in diameter and has a plurality of longitudinally extending grooves cut in the periphery thereof. This portion of the shaft revolves in proximity to the mouth of a hopper which delivers a predetermined number of leads to each of the grooves as they rotate past the mouth of the hopper.

The hopper just referred to is supplied with leads from a primary hopper, means being interposed between the two hoppers for eliminating the leads which are of less than a predetermined length.

For automatically positioning the ends of the containers or magazines in registry with the ends of the leads thus selected from the first-mentioned hopper, I provide what I will term a container magazine receiving drum which comprises means for successively receiving and holding the magazines to be filled, these magazines being manually placed upon the drum by the operator. I then provide a second or filling drum to which the magazines are automatically transferred from the receiving drum. The second drum holds the magazines or containers with their open ends in registry with one end of the slots cut in the periphery of the main shaft. I then provide plungers or other suitable means for operating in the longitudinally extending slots of the main shaft to displace the leads therefrom and force them into the open ends of the magazine. Means are then provided for automatically discharging the filled magazines from the filling drum.

Referring now to the drawings for a detailed description of my machine, the base thereof comprises the two longitudinally extending side plates 25 and 26, suitable end plates 27 and 28 respectively, and a cross bar 29. It will, of course, be understood that any other suitable base construction may be employed.

The ends of the main shaft 30 are suitably journaled in the bearings 31 and 32 formed in the end plates 27 and 28 respectively (see Figures 8 and 10). This shaft is driven in a clockwise direction (looking toward the right hand end in Figures 1 and 2) by a mechanism which will later be described in detail. The shaft 30 is enlarged intermediate its ends between the points marked A and B respectively (see Figures 8 and 10). Longitudinal groves 33 are cut in the periphery of this enlarged portion for receiving the cross-head guides 34 and the cross-heads 35, the detail construction of which will be referred to later on.

The shaft 30 is further enlarged between the points C and B (see Figure 10). A plurality of longitudinally extending dovetailed shaped slots 36 (see Figure 14) are cut in the periphery of the last-mentioned enlargement; the slots 36 open into and form a radial extension of the slots 33. Dovetailed shaped bars 37 are inserted in the grooves 36 so as to form closures for the open sides of the slots 33 and are provided in their outer faces with a pair of spaced slots 38. These slots slidably receive a pair of plungers 39, the left hand ends of which are pivotally connected to the cross-heads 35 as indicated at 40. I provide means which will later on be described in detail for reciprocating the cross-heads 35 so as to cause them to successively move into and out of the positions illustrated in Figure 10. In this manner the leads which are to be inserted in the magazines are successively permitted to drop into the slots 38 formed in the bars 37 and then inserted in the magazines.

I shall now describe the means by which the leads are supplied to the slots 38. These means comprise a primary and secondary hopper, the end walls of which are formed by the two side plates 41 and 42 respectively and the side plates 43 and 44 respectively. The forward ends of the side plates 41 and 42 are secured to the outside of the side plates 43 and 44 respectively by means of screws 45, as shown in Figure 3. A back plate 46 extends upwardly from the side member 25 of the base and provides a support for the lower ends of the side plates 43 and 44, these plates being secured to the back plate by means of screws 47 or in any other suitable manner (see Figures 3, 14 and 15). Bars 48, the upper ends of which are secured to the side plates 41 and 42, as shown in Figure 3, and the lower ends of which are secured to the edges of the back plate 46, as shown in Figure 14, provide suitable braces for the primary hopper.

The bottom 49 of the primary hopper is secured to the side plates 41 and 42 by screws 50 (see Figures 3 and 14). An end wall 51 secured between the side plates 43 and 44 forms the lower end of the hopper toward which the leads gravitate by reason of the inclined position of the bottom 49. The primary hopper is divided into two compartments by the center partition 52.

To prevent the leads from lodging against the rear edges of the side plates 43 and 44, I provide the two plates or inserts 53 and 54 (see Figure 1), the upper edges of which are beveled toward the upper end of the primary hopper. A cross-bar 55 (see Figure 14) extends between the two side plates 43 and 44 and has a tongue and groove connection with the central partition and this tends to hold it in an upright position.

The two oppositely inclined end plates 56 and 57 form the front and rear end walls respectively of the secondary hopper and are secured between the side plates 43 and 44. The forward edges of these side plates are provided with the extensions 43' and 44' respectively, which are supported by the upper ends of the brackets 58 and 59 respectively, by the rod 60. The lower ends of the brackets 58 and 59 are secured to the front side member 26 of the base by means of screws 61 (see Figure 2).

For transferring the leads from the primary hopper to the secondary hopper, and at the same time separating the short leads from those of the proper length, I provide the roller 62 which has a plurality of longitudinally extending grooves 63 cut in its periphery. The ends of the roller 62 are reduced in diameter and journaled in the bearings 64 and 65 supported by the side plates 43 and 44 respectively. The roller 62 is supported so that its periphery or rather a portion thereof closes the mouth of the primary hopper (see Figure 14) in such a manner that upon rotation of the roller, the leads will drop into the grooves 63 and be carried forward out of the hopper.

A shaft 66 is rotatably supported in bearings 67 and 68 carried by the side plates 43 and 44 respectively and has mounted thereon, two spools 69 and 70. Discs 71 are secured to each end of each of the spools. The edges of the discs 71 project into annular grooves 72 formed in the periphery of the roller 62 and are provided with teeth 73 which are adapted to lift the leads out of the grooves 63 of the roller 62 and carry them forwardly and downwardly until they drop onto the deflecting plate 74 (see Figure 14) and roll into the secondary hopper. The distance between the toothed discs 71 of each spool is equal to the minimum length of lead which it is desired to insert into the magazines. Consequently, if the wheel 62 carries shorter leads out of the primary hopper, they will not be long enough to span the distance between the discs 71 of each of the spools 69 and 70 and will drop down between these discs and out of the machine. In this manner I separate undesirably short leads from those of proper length.

In order to compensate for the loss of these broken and short leads, a larger number of leads must be taken from the primary hopper per revolution of the shaft 30 than are delivered to the secondary hopper. This may be done either by varying the gear ratio between the drum 62 and the shaft 30, or, as I have shown in the present embodiment of my invention, where the drum 62 rotates twice for each revolution of the shaft 30 by using thirteen in place of twelve grooves 63 on the drum 62. This effects a removal of thirteen leads from the primary hopper for each twelve which is used in filling a magazine.

The roller 62 and the shaft 66 upon which the two spools 69 and 70 are mounted are driven from the main shaft through the following instrumentalities. A spur gear 75 is secured to the main shaft 30 by pin 75' (see Figures 10 and 17) and meshes with the pinion 76 which in turn, is rotatably mounted on the stub shaft 77 projecting inwardly from the end plate 28. The stub shaft 77 likewise carries the gear 78 which is secured to the pinion 76 in any suitable manner so as to rotate therewith. The gear 78, in turn, meshes with the gear 79 which is integral with one end of the hub 80. The hub 80 is secured to the shaft 81 by means of a pin 82 so as to cause the shaft 81 to rotate therewith. A gear 82 is secured to the opposite end of the shaft 81 by means of a pin 83 and meshes with the pinions 84 and 85, as shown in Figures 10 and 17, in such a manner as to cause both of these gears to rotate in a counter-clockwise direction looking toward the gears from the right hand end of the machine. The gears 84 and 85 are secured to the shaft 66 and the reduced end of the roller 62 respectively, by means of the pins 86 and 87. One end of the shaft 81 is journaled in the bearing 90 which is supported by the side plate 44 and the other end of the shaft 81 is journaled in the bearing block 91 which is secured to the outer side of the end plate 28 (see Figures 1, 2 and 10). The shaft 81 is slidably mounted in its bearings 90 and 91 so that it can be shifted by means of a handle 81' longitudinally toward the right to bring the gear 79 into the position shown in dotted outline in Figure 10, and thus out of driving engagement with the gear 78. In this manner the means for transferring the leads from the primary hopper to the secondary hopper can be rendered inoperative whenever desired. It will be noted that the faces of the two pinions 84 and 85 are so wide that the gear 82 remains in mesh with these gears when the shaft 81 is shifted to its extreme right hand position.

For holding the shaft 81 in either of its adjusted positions, I provide the two annular grooves 92 and 93 in the hub of the gear 79 which are adapted to be engaged by the spring latch 94 which, as shown in Figures 1, 2 and 10, is secured to the bearing block 91.

It will be noted from an inspection of Figures 1, 2, 10 and 14 that the center wall 52 has a forwardly projecting extension which extends into the end wall 51 of the primary hopper and downwardly into the annular groove 95 (see Figure 11) of the roller 62 and into the annular groove 96 between the two spools 69 and 70 so as to form an abutment for the adjacent ends of the leads occupying the grooves of the roller 62 and carried by the teeth of the spools 69 and 70 so as to prevent any interference between leads having adjacent ends.

From an inspection of Figures 10 and 14, it will be noted that the enlarged portion of the shaft 30 which carries the slotted members 37 for receiving the leads from the secondary hopper, is surrounded by and supports a cylindrical sleeve 97. At its upper side the sleeve 97 is provided with a slot for receiving the lower edges of the walls 56 and 57 of the secondary hopper. Lugs 98 and 99 (see Figures 15 and 14 respectively) formed on the side plates 43 and 44 respectively, project into the slot just mentioned adjacent the ends thereof and prevent the sleeve 97 from rotating on the main shaft. The sleeve 97 closely embraces the enlarged periphery of the shaft 30 and prevents the leads carried in the grooves 38 from dropping out of these slots as the shaft 30 rotates to successively bring the grooves to the lower side of this shaft.

Having thus described the means by which a predetermined number of leads of the proper length are successively supplied to the grooves 38, I shall next describe a means by which the magazines to be filled are brought into alignment with the grooves 38 with their open ends positioned to receive the leads as they are discharged from these grooves. Before describing this mechanism, however, I shall first briefly describe the construction of the magazines which are to be filled by the embodiment of my invention disclosed in this application.

By referring to Figures 18, 19 and 20, it will be noted that this magazine comprises two tubes 100 which, as shown in Figure 20, are more or less bean-shaped in cross-section and are held in spaced parallel relation by means of the cap 101 which closes one end of these tubes and the screw-threaded cap 102 into which the ends of the tubes 100 project, as shown in Figure 18. Each of the tubes 100 is sufficiently large in cross-section to hold three of the leads lying side by side and of sufficient length to receive two columns of leads so that each tube is capable of holding six leads arranged as shown in Figure 19.

As described above, the means for bringing the open ends of the magazines into registry with the ends of the grooves 38 comprises a receiving drum onto which the operator feeds or secures the magazines and a filling drum to which the magazines are transferred from the receiving drum. The receiving drum comprises the shaft 105 which is rotatably mounted in the bearings 106 and 107 (see Figure 1) carried by the forwardly projecting extensions 108 and 109 of the bracket 59 and the end plate 28 respectively. A sleeve 110 is secured to the shaft 105 by a pin 111. Discs 112 and 113 are secured to the opposite ends of the sleeve 110 by means of screws 114 or in any other suitable manner. A pair of discs 115 and 116 respectively are secured to opposite sides of the disc 112 by means of rivets 117 and spacer washers 118 and 119. A disc 120 corresponding to disc 116 is secured to disc 113 by means of rivets 121 and spacer washers 122, as shown in Figure 12. The disc 115 merely acts as an abutment for the end of the magazine having the screw-threaded cap.

A plurality of notches 123 are formed in the periphery of the discs 116 and 120, the notches in the two discs being in alignment so as to be able to receive the magazines. (See Figure 16.)

A plurality of pairs of latches 124 corresponding in number to the number of notches in the periphery thereof are pivotally mounted on each of the discs 116 and 120 by means of the pins 125. Near their outer ends the inner edges of adjacent pairs of latches are cut away to provide opposed notches 126 which are in registry with the lower portions of the notches 123 and adapted to receive the magazines. The outer portion of the inner edges of the latches 124 divert outwardly as shown at 127 so as to cause the outer ends of the latches to automatically separate upon the insertion, by the attendant, of a magazine. The inner ends of adjacent pairs of latches are connected by tension springs 128 which tend to urge the outer ends of these latches toward the opposite sides of the notches 123 with which they are associated and to thus yieldingly hold the magazines inserted in the notches 123. Pins 129 supported by the discs 116 and 120 limit the movement of each pair of notches toward each other.

For reasons which will be explained later on, it is necessary to deliver the magazines from the receiving drum to the filling drum in a certain definite position. This necessitates the provision of means for holding the magazines in a definite position on the receiving drum. These means comprise a plurality of flat studs 130 corresponding in number to the number of notches in the periphery of the discs 116 and 120. The inner ends 131 of these studs are inserted in suitable openings in the peripheries of the discs 112 and 113 (see Figure 12) and held in place by means of pins 132. Intermediate their ends the studs 130 are enlarged, as shown at 133, to provide abutments for the sides of the tubes 100 forming the magazines.

In feeding the magazines to the receiving drum, the operator inserts them in the notches 123 of the discs 116 and 120 in the position indicated in the upper right hand corner of Figure 16 and then forces them inwardly between the latches 124 until the tubes forming the magazine, occupy the notches 126 and lie upon opposite sides of the studs 130. These studs are slightly thicker than the space between the tubes forming the magazine as a result of which these tubes are slightly sprung away from each other upon the insertion of the studs between them and are, additionally, held in place by the friction between the sides of the studs and the tubes.

The magazines are to be inserted into the receiving drum with the end of the screw-threaded cap 102 in contact with the disc 115. The operator is assisted in doing this by the guard plate 135 (see Figures 3, 12 and 15). This guard plate is mounted upon the shaft 105 and held against rotation by a downwardly extending arm 136 which is secured to the bracket 59 by a pin 137. The guard plate is provided with an annular strip 138 which overhangs the periphery of the disc 115 so that one face of the strip is flush with the right hand face of the disc 115 (see Figure 12).

In inserting the magazines, the operator merely places the ends having the screw-threaded cap 102 against the face of the annular strip 138 and then moves them inwardly into the notches formed in the discs 116 and 120 respectively.

The receiving drum is rotated in a counter-clockwise direction looking from the right hand end of the machine by the gear 140 which is secured to the shaft 105 on which the receiving drum is mounted. The gear 140 meshes with the gear 75 described above as being rigidly secured to the main shaft 30.

The filling drum is formed of two members, each of which has a hub 141 secured to the main shaft 30 by a pin 142. The opposite ends of these hubs have formed integrally therewith quadrangular-shaped flanges 143, the corners of which have studs 144 similar in construction to the studs 130 heretofore described as forming a part of the receiving drum and likewise comprising abutments 145 similar to the abutments 133 of the studs previously described.

The gear ratio between the gears 75 and 140 is such that successive studs on the receiving drum are brought into the same horizontal plane with successive studs on the filling drum to permit the transfer of the magazines from the studs of the receiving drum to the studs of the filling drum. This is clearly illustrated in Figures 12 and 16. To prevent interference between the magazines carried by the receiving drum and the studs of the filling drum as the successive studs of the two different drums are brought into alignment with each other, it is necessary that the magazines be inserted in the notches of the receiving drum until they contact with the abutments 133. To insure this, I provide a pair of cam-shaped guides 150 and 151 (see Figures 2 and 16) the faces of which bear against the outer edges of the tubes forming the magazines and force them inwardly as the receiving drum rotates them to their proper positions.

For transferring the magazines from the receiving drum to the filling drum, I provide a plurality of transfer levers, three of these being illustrated in the embodiment of my invention disclosed herein. These three levers 152, 153 and 154 respectively, are rigidly secured to the rocker shaft 155 (see Figure 1) and project downwardly in position to engage the inner sides of the magazines as the magazines are successively rotated in position to be transferred to the filling drum (see Figures 16 and 17). The rocker shaft 155 is journaled in suitable bearings in the side plate 44 and the end plate 28 respectively. For rocking the rocker shaft 155 at the instant the magazines are to be transferred from the receiving drum to the filling drum, I provide the rocker arm 156 which is provided at its free end with an anti-friction roller 157 which rolls upon the periphery of the cam 158. The roller 157 is held in contact with the cam by a tension spring 156′, one end of which is suitably secured to a pin 155′ projecting from the shaft 155 and the other end of which is secured to a pin 156″ projecting from the end plate 28 (see Figures 1 and 17). This cam is provided with a dwell portion 159 which holds the arm 156 inactive until the instant the transfer is to be effected.

There is abrupt rise 160 at one end of the dwell which gives an abrupt movement to the transfer arms at the instant the studs on the two drums are in alignment with each other as to practically instantaneously shift the magazine from one set of studs to the other. A more gradual rise 161 follows the abrupt rise 160 and completes the positioning of the magazines upon the studs of the filling drum. It will be noted from an inspection of Figure 12 that the studs of the two drums are beveled so as to overlap each other when they are in their aligning positions, thereby facilitating the transfer of the magazines from one set of studs to the other.

Figure 16 illustrates the transfer arms as being not quite in alignment with each other. This is because the two outer arms respectively engage the end caps 101 and 102, (see Figure 12), whereas the intermediate arm engages with the sides of the magazine.

To further insure the magazines being properly positioned upon the studs of the filling drum with their inner sides in contact with the abutments 145, I provide the two annular guides 160' and 161' which partially surround the filling drum and the leading ends of which are rounded, as shown at 162 (see Figure 16) to cam the magazines into their final position in the event they have not been so positioned by the transfer arms. The guide 161' also acts as an abutment for the inner edges of the flange of the caps 102 of the magazines to hold the ends of the caps against the disc 164 in registry with the openings 163. The magazines thus transferred to the filling drum are held with their open ends in alignment with openings 163 formed in the disc 164 (see Figures 10 and 12). The disc 164 is rigidly secured to the shaft 30 with the openings 163 in registry with the ends of the grooves 38. The ends of the openings 163 adjacent the grooves 38 are somewhat larger in cross section than the ends adjacent the filling drum. The ends last mentioned have substantially the same cross section as the openings of the tubes forming the magazines, as a result of which the leads are properly guided from the grooves 38 into the tubes forming the magazines.

After the leads are inserted in the respective magazines in the manner heretofore described, they are to be discharged from the filling drum. In the particular embodiment of my invention which I have herein disclosed, the leads are completely inserted into the magazine at substantially the instant the magazine reaches its lowermost position, as shown in Figure 16. Immediately after it has been filled, it rotates into position so that it is no longer supported by the lower extension of the guides 160' and 161'. At this instant, the discharge arms 170, 171, and 172 which are secured to the shaft 173 and correspond in longitudinal position relative to the magazine with the transfer arms 152, 153 and 154 respectively, are moved downwardly and displace the magazine from the studs of the filling drum. One end of the shaft 173 is journaled in the upper end of the post 174 and the opposite end is journaled in the bearing 175 formed in the end plate 28. The shaft 173 is rotated in a counter-clockwise direction looking from the right hand end of the machine by the gear 177 (see Figures 10 and 17) which meshes with the gear 178 rotatably mounted upon the shaft 30 and rigidly secured to the gear 179 and the cam 158. The gear 179 meshes with the gear 78 heretofore described and is consequently rotated in a clockwise direction looking from the right hand end of the machine. The ratios between the various gears interposed between the main shaft 30 and the shaft 173 are such that the shaft 173 makes a single revolution for each set of studs carried by the filling drum. In other words, in the embodiment illustrated, the shaft 173 makes four revolutions to each revolution of the main shaft 30.

It will be clear from the above description that the gear ratios between the shaft 30 and the gear 179 to which the cam 158 is secured are such that the cam 158 revolves at the same speed as the gear 177. This ratio must be such that the cam 158 will make four revolutions to each revolution of the filling drum or the main shaft 30 in order to transfer the proper number of magazines from the receiving drum to the filling drum.

I shall next describe the means by which the plungers 39 are actuated in the grooves 38.

The cross heads 35 are formed of two parts 180 and 181 which are secured together by rivets 182 (see Figures 8, 10 and 13). The inner part 181, is provided with a T-head 183 which slides in a correspondingly-shaped slot in the first described enlargement of the shaft 30. The cross-heads are each provided with a hollow cross-head pin 184. An end of each of the links 185, 186, 187 and 188 is secured to its respective cross head pin 184 by a screw 189. The ends of the links are spaced from the cross-heads by washers 190.

For reciprocating the various cross heads, I provide a number of differential pinions 191, 192, 193 and 194 corresponding in number to the number of cross-heads, which are rotatably secured upon the sides of the square reduced portion 195 of the shaft 30 by means of the screws 196, 197, 198 and 199. A sleeve 200 is supported by the shaft 30. The outer end of the sleeve 200 is polygonal in cross-section, as shown at 201 in Figure 7 and is held against rotation by the lever 202 which has an opening formed in its inner end corresponding in shape to the outer end 201 of the sleeve 200. The free end of the lever 202 is pivotally connected at 203 with a link 204 which is, under ordinary running conditions, held stationary by means of the tension spring 205 (see Figure 3). The inner end of the sleeve 200 is provided with a differential gear 206 which meshes with teeth 207 formed on the pinion 192 adjacent its outer side and also with the teeth 208 formed on the pinion 194 adjacent its outer side. The last two mentioned pinions have teeth 209 and 210 respectively which mesh with corresponding teeth formed adjacent the inner sides of the pinions 191 and 193. The gear 206 and the pinions having teeth 207 and 208 respectively are of the same size and consequently each of the pinions 191, 192, 193 and 194 which are also of the same size makes one complete revolution for each revolution of the main shaft 30. A bevel gear 211 is rotatably mounted upon the shaft 30 and meshes with the bevel pinions having teeth 207 and 208. This gear merely acts as a thrust bearing for the last two mentioned pinions and is held in position by means of the collar 212 which is secured to the shaft 30 by the screws 213.

Crank arms 215, 216, 217 and 218 are secured to the outer faces or sides of the pinions 191, 192, 193 and 194 respectively by means of screws 220. The ends of links 186 and 188 remote from the corresponding cross heads are pivotally secured to the free ends of the crank arms 216 and 218 by means of stepped bearing pins such as shown at 222 in Figure 9, these pins being held in place by means of the screws 223 and the washers 224. The corresponding ends of the links 185 and 187 are laterally extending, as shown at 225 in Figures 1 and 4, in which are formed transversely extending arcuate slots 226. Bearing pins, such as shown at 227 in Figure 8, extend through the outer ends of the arms 215 and 217 and the slots 226 and the corresponding links 185 and 187 respectively, and are secured in place by the screws 228. The diameter of the pins 227 at the point where they pass through the slots 226 is such that the pins can slide freely in the slots 226.

A lever 230 is pivotally mounted upon each of the links 215 and 217 by means of a pin 231 (see Figures 1, 4 and 8). This lever comprises a short arm 232 and a long arm 233 which are rigidly connected and spaced by the sleeve 234 through which the pin 231 extends. The free end of the long arm 233 is bifurcated and passes around the pin 227 beneath the washer 235 and the end of the link. The free end of the short arm 232 is connected with one end of a tension spring 236, the opposite end of which is connected with the pin 237 secured to the link. A block 238 is secured to a sleeve 239 which, in turn, is rotatably mounted upon the sleeve 200, the outer end of the sleeve 239 being provided with a gear 240 rotated by means about to be described.

The block 238 is square in cross section (see Figure 7) and has secured to the opposite sides thereof, adjacent the links 215 and 217 respectively, horse-shoe shaped guides 242 and 243 respectively which lie in the plane of the links 185 and 187 respectively. From an inspection of Figure 4, it will be seen that the ends of the transversely extending head 225 of the link 185 alternately bear against the two prongs of the horse-shoe-shaped guide 242 as the link 185 is oscillated from one side to the other of the center of the shaft 30 by the movement of the arm 215. The result is that the outer end of this link is constantly urged inwardly against the tension of the spring 236 from the position which it would occupy if it was pivotally connected to the arm 215 by means of a pivotal connection similar to that which I employ for securing the links 186 and 188 to the corresponding arms 216 and 218 respectively. As a result, the end of the links 185 and 187 describe elliptical rather than circular paths.

The purpose of the construction described immediately above is to prevent interference between the links secured to one arm and the free end of the adjacent arm. This will be more clearly understood from an inspection of Figures 4 and 5 which disclose the position occupied by the various parts mounted upon the shaft 30 being advanced approximately 55° past the position occupied by this shaft in the remaining figures of the drawings. The interference above referred to would occur between the ends of the arms 216 and 218 and the links 185 and 187. There would be an interference between each of the arms 216 and 218 and the links 185 and 187 respectively during each revolution of the arms 216 and 218.

In Figure 4 I have illustrated in dotted outline the position the link 185 would occupy if it was not crowded inwardly by the engagement between its head 225 and the guide 242. By comparing the relative positions of the arm 216 and the link 185, as shown in Figure 4 with the positions actually occupied by these two elements as shown in Figure 5, it will be clearly seen that but for the compensation action of the head 225 and the guide 242, the end of the arm 216 would engage the link 185 and stop the machine. By use of the guide 242, I hold the link 185 inwardly, from the position which it would otherwise occupy, a sufficient length of time to permit the arm 216 to move into a noninterfering position. It will be clear that as the arm 215 continues to rotate, the opposite side of the head 225 will be brought into contact with the opposite prong of the guide 242, thereby causing the link 185 to again be moved inwardly, but in the opposite direction to prevent it from interfering with the arm 218.

Referring now to Figures 1, 3, 6, 7, 8 and 9, I shall describe the means by which I supply power to the mechanism above described.

An electric motor 250 is connected with a source of current through the switch 251. The electric motor is provided with a belt pulley 252 which drives a second pulley 253 through the medium of the belt 254. The pulley 253 is rotatably mounted upon the end of the shaft 255 (see Figure 6) and is connected in driving relation therewith by means of the pawl 256 which is pivoted upon the pulley at 257. The pawl 256 is adapted to engage with a ratchet tooth 258 formed on the shaft 255 under the tension of the spring 259, one end of which is secured to the pulley and the other end of which is secured to an arm 260 projecting from the pawl.

The arrangement above described is such that as long as the pulley 253 rotates in a counter-clockwise direction (see Figure 6) there will be a driving engagement between the pawl 256 and the tooth 258 but, if for any reason, the motor should reverse its direction of rotation, the pawl 256 will merely ratchet past the tooth 258 without turning the shaft 255. A cover plate 261 may be secured to the open end of the pulley 253. The shaft 255 is rotatably supported in a bracket or housing 262 projecting from the base and is provided at its inner end with a worm 263 which engages with the worm gear 264 secured to one end of the shaft 265, one end of which is suitably journaled in the housing 262 and the other end of which is journaled in bearing 266. The forward end of the shaft 265 is likewise provided with a worm 267 which drives the worm gear 268. The worm gear 268 is mounted upon the hub 269 of the gear 270, both the worm wheel and gear being rigidly secured to the shaft 30 by a pin 271.

In order to maintain the proper relation between the horse-shoe shaped guide and the links with which they are to co-act, it is necessary to make the block 238 which supports these guides rotate in synchronism with the shaft 30. This I accomplish through the stud shaft 272 (see Figures 1, 3 and 7) the outer end of which is secured in the end plate 27 and the two gears 273 and 274 which are rotatably mounted upon the shaft 272 and connected by a sleeve 275. The gear 273 meshes with the gear 270 and the gear 274 meshes with the gear 240. In this manner the block 238 carrying the guides 242 and 243 is caused to rotate in the same direction as, and in synchronism with, the shaft 30.

The rear end of the link 204 is pivotally connected at 280 with the handle 281 of the switch 251 as previously described. The forward end of the link 204 is pivotally connected with the arm 202, the inner end of which engages the polygonal end 201 of the sleeve 200. Since all of the power communicated to the reciprocating plungers, which insert the lead into the magazines, and the means for operating these plungers is transmitted thereto by reaction against the gear 206 carried by the sleeve 200, if anything such as the jamming of the lead in the slots 38 or in the tubes of the magazine should occur which would tend to stop the reciprocating parts or even the rotating parts connected therewith, or if the operator should accidentally get his fingers caught in the moving parts of the machine, there would be a reaction upon the gear 206 tending to move the arm 202 from the rearward position shown in dotted outline in Figure 3 to the forward position shown in dotted outline in the same figure, thereby causing the link 204 to move forwardly and open the switch 251. This would disconnect the motor from the source of power and immediately permit the mechanism to come to rest without injuring any part thereof.

While I have described the details of construction of the preferred embodiment of my invention, it is to be clearly understood that my invention is not limited to these details but is capable of other adaptations and modifications within the scope of the appended claims. It must also be understood that although I have described my invention as being embodied in a machine for filling pencil leads into magazines, it is not, in any sense, limited to this particular use but may be used for inserting other rod-like objects into suitable containers.

Having thus described my invention, what I claim is new and desire to secure by Letters Patent of the United States, is:—

1. A machine for inserting pencil leads into containers having a plurality of parallel compartments, which comprises a shaft having a plurality of sets of longitudinally extending grooves in the periphery thereof, the number of grooves in each set corresponding to the number of compartments in said containers, the said grooves being of such a size as to receive a predetermined number of leads; means for successively filling said grooves as said shaft rotates, comprising a hopper having a slot therein extending parallel with said grooves and in close proximity to the periphery of said shaft; a second hopper; means between said hoppers for causing short leads to be separated from the long and for conveying long leads from said firstnamed hopper to said second hopper; a filling drum for receiving and holding containers with their openings in registry with one end of said grooves; a receiving drum; means for transferring said containers from said receiving drum to said filling drum; plungers reciprocably mounted on said shaft and slidable in said grooves; means for reciprocating said plungers as said shaft rotates to displace the leads from said grooves; and means for displacing said containers from said filling drum.

2. A machine for inserting pencil leads into containers which comprises a shaft having a plurality of grooves in the periphery thereof, the said grooves being of such a size as to receive a predetermined number of leads; means for successively filling said grooves as said shaft rotates, comprising a hopper having a slot therein extending parallel with said grooves and in close proximity to the periphery of said shaft; a second hopper; means between said hoppers for causing short leads to be separated from the long and for conveying long leads from said firstnamed hopper to said second hopper; a filling drum for receiving and holding containers with their openings in registry with one end of said grooves; a receiving drum; means for transferring said containers from said receiving drum to said filling drum; plungers reciprocably mounted on said shaft and slidable in said grooves; means for reciprocating said plungers as said shaft rotates to displace the leads from said grooves; and means for displacing said containers from said filling drum.

3. A machine for inserting pencil leads into containers which comprises a shaft having a plurality of grooves in the periphery thereof; means for successively filling said grooves as said shaft rotates, comprising a hopper having a slot therein extending parallel with said grooves and in close proximity to the periphery of said shaft; a filling drum for receiving and holding containers with their openings in registry with one end of said grooves; a receiving drum; means for transferring said containers from said receiving drum to said filling drum; plungers reciprocably mounted on said shaft and slidable in said grooves; means for reciprocating said plungers as said shaft rotates to displace the leads from said grooves; and means for displacing said containers from said filling drum.

4. A machine for inserting pencil leads into containers comprising a solid shaft having a plurality of longitudinally extending grooves in the periphery thereof; means for depositing leads in said grooves; means for successively receiving and holding containers with their openings in registry with one end of said grooves; means on said shaft for displacing the leads from said grooves into said containers including crank arms rotating on axes perpendicular to the axis of said shaft; and means for removing said containers from said holding means.

5. A machine for loading containers comprising a member having a plurality of parallel grooves in the face thereof; means for holding containers with their openings in registry with one end of said grooves; means for displacing the leads from said grooves into said containers; and means controlled by said displacing means for disconnecting said displacing means from the source of power whenever undue resistance is offered to the displacement of leads in any of said grooves.

6. A machine for loading containers comprising a member having a plurality of parallel grooves in the face thereof; means for holding containers with their openings in registry with one end of said grooves; means for displacing the leads from said grooves into said containers; and means for disconnecting said displacing means from the source of power controlled by the resistance offered to the displacement of leads in any one of said grooves.

7. A machine for loading containers comprising a member having a plurality of parallel grooves in the face thereof; means for holding containers with their openings in registry with one end of said grooves; means for displacing the leads from said grooves into said containers; and means for rendering said displacing means inoperative controlled by the resistance offered to the displacement of leads from any one of said grooves.

8. A machine for inserting rodlike objects into containers comprising a hopper for receiving said rodlike objects; a second hopper for receiving said rodlike objects from said first hopper; means intermediate said hoppers for causing short ones of the rodlike objects to be separated; means for receiving a predetermined number of rodlike objects from said lastmentioned hopper; means for successively receiving and discharging containers; and means for longitudinally displacing said rodlike objects from said receiving means into said containers.

9. The combination with a receiving drum for receiving cylindrical containers, of a filling drum, a plurality of jaws on said receiving drum for grasping the containers, means for successively releasing said containers from said jaws and transferring them onto said filling drum, and means for inserting rodlike objects in said containers while said filling drum is in motion.

10. The combination with a filling drum for holding rod-like containers having non-circular end openings and external portions having non-circular conformations, of a second drum for successively delivering said containers to said filling drum, positioning members on one of said drums engaging the non-circular portions of successive containers for delivering them onto said filling drum with the containers turned about their own axes to bring their non-circular end openings into predetermined definite relations to radii passing therethrough from the axis of the drum.

11. A machine for inserting rodlike objects into containers, comprising two rotatable elements for bringing the rodlike objects into registry with the openings in said containers, a hopper for holding said rodlike objects, and means intermediate said hopper and one of said rotatable elements for separating longer rodlike objects from the shorter rodlike objects.

In witness whereof, I hereunto subscribe my name this 16th day of November, 1920.

JOHN C. WAHL.

Witnesses:
W. H. SMITH,
T. D. TEFFT.